(12) United States Patent
Harumoto et al.

(10) Patent No.: US 6,253,008 B1
(45) Date of Patent: Jun. 26, 2001

(54) OPTICAL FILTER AND METHOD OF MAKING THE SAME

(75) Inventors: Michiko Harumoto; Masakazu Shigehara, both of Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/328,508

(22) Filed: Jun. 9, 1999

(30) Foreign Application Priority Data

Jun. 26, 1998 (JP) .................................................. 10-180844

(51) Int. Cl.⁷ .................................................... G02B 6/34
(52) U.S. Cl. .................................................. 385/37; 385/31
(58) Field of Search ................................. 385/37, 31, 27, 385/14

(56) References Cited

U.S. PATENT DOCUMENTS 5,703,978   12/1997   DiGiovanni et al. .................. 385/37
5,764,829 *  6/1998   Judkins et al. ......................... 385/37

FOREIGN PATENT DOCUMENTS 9-236720      9/1997   (JP) .
11038238  *   2/1999   (JP) ......................................... 385/37
11326654  *   2/1999   (JP) ......................................... 385/37

OTHER PUBLICATIONS

"Cladding–Mode Resonances In Short–and Long–Period Fiber Grating Filters", by Erdogan, Journal of Optical Soc. Am., vol. 14, No. 6, Aug. 1997.

* cited by examiner

Primary Examiner—Rodney Bovernick
Assistant Examiner—Ellen E. Kim
(74) Attorney, Agent, or Firm—McDermott, Will & Emery (57) ABSTRACT

The present invention relates to an optical filter having a long-period grating which couples, in signal light propagating through a core region, core mode light having a predetermined wavelength to cladding mode light, thereby attenuating the core mode light; and a method of making the same. In particular, in the filter area provided with the long-period grating, the intervals of individual parts exhibiting its average refractive index is constant along the advancing direction of the signal light, whereas values of maximum points and minimum points of a refractive index modulation function defining the refractive index vary along the advancing direction of the signal light.

9 Claims, 9 Drawing Sheets

FILTER AREA
100
110
AX
120

Fig.3B

REFRACTIVE INDEX
P1
F1
P3
AV
AM(r)+AV
P2
F2
r

OPTICAL FILTER AND METHOD OF MAKING THE SAME

BACKGROUND OF THE INVENTION

1. Field of the Invention

The present invention relates to an optical filter suitable for an optical transmission system or the like; and, in particular, to an optical filter in which a long-period grating in an optical waveguide such as an optical fiber causes, in light having a predetermined wavelength, a core mode to effect mode coupling with a cladding mode, thereby attenuating core mode light having the predetermined wavelength.

2. Related Background Art

Optical filters have transmission characteristics depending on the wavelength of light and can be used, for example, in an optical transmission system together with an optical amplifier, so as to equalize the wavelength dependence of gain of the optical amplifier. Namely, in an optical amplifier which optically amplifies incident light in a predetermined wavelength band and outputs thus amplified light, its gain upon optical amplification may vary depending on the wavelength. Also, the intensity of incident light may vary depending on its wavelength, thereby the intensity of the light outputted after being optically amplified may vary depending on the wavelength as well. An optical filter having such a transmission characteristic as to yield a loss peak wavelength at the same wavelength as the peak wavelength of the output light from the optical amplifier equalizes the wavelength dependence of the intensity of light outputted from the optical amplifier.

As such an optical filter, an optical fiber (optical fiber type optical filter) formed with a long-period grating in a predetermined area (filter area) has been known. This optical fiber type filter is preferably used due to its small insertion loss in optical fiber transmission systems or the like. In this type of optical filter, the long-period grating formed in the optical fiber causes a part of core mode light to effect mode coupling with cladding mode light, thereby attenuating a desirable light component. The transmission characteristic of the optical filter depends on the propagation constant of core mode light, the propagation constant of cladding mode light, the coupling constant between core mode light and cladding mode light, and the period of change in refractive index (grating period) in the long-period grating, and can be analytically obtained by solving mode coupling equations.

SUMMARY OF THE INVENTION

Figure 1:
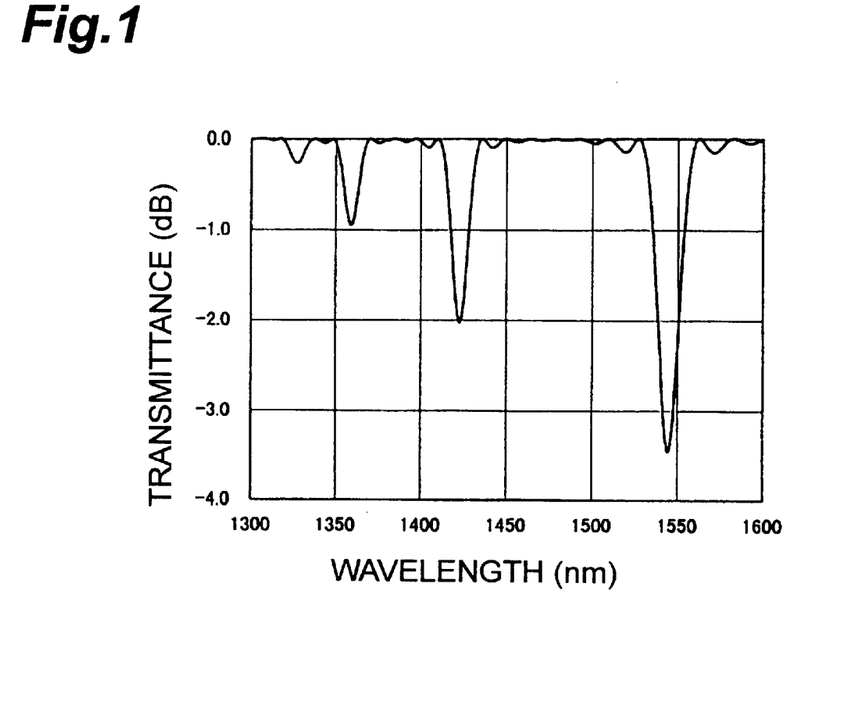
FIG. 1 is a chart showing the transmission characteristic of an optical filter having a conventional long-period grating in the wavelength range of 1300 nm to 1600 nm.
Figure 2:
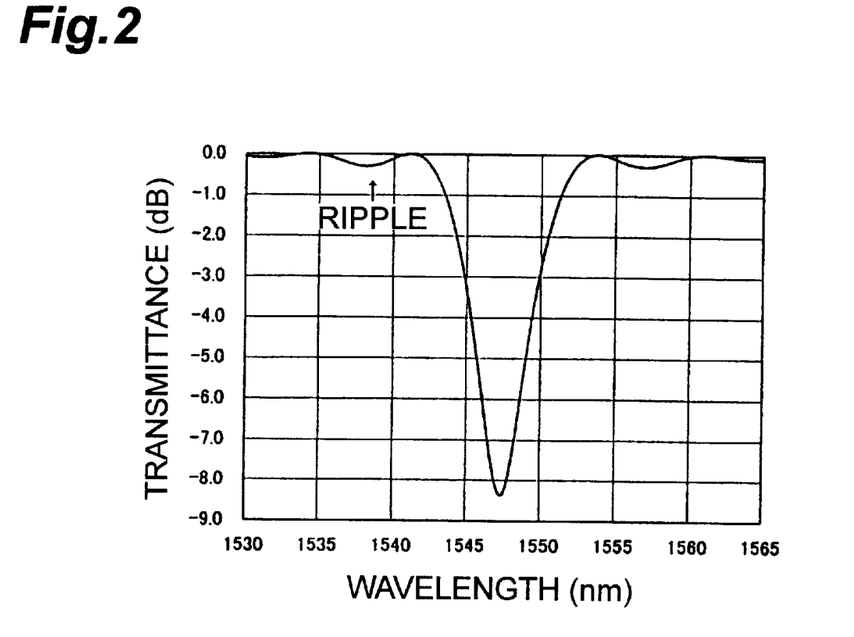
FIG. 2 is a chart showing the transmission characteristic of the optical filter having the conventional long-period grating in the wavelength range of 1530 nm to 1565 nm.

As a result of studies of the above-mentioned prior art, the inventors have found the following problems. Namely, in the above-mentioned prior art, when making or using an optical filter, the loss peak wavelength of the optical filter is generally caused to coincide with the peak wavelength of the core mode light outputted from the optical amplifier or the peak wavelength of gain of the optical amplifier. However, the transmission characteristic of an optical filter equipped with a long-period grating has a plurality of loss peak wavelengths, and each loss peak wavelength has a ripple (side peak) in the vicinity thereof. FIGS. 1 and 2 show transmission characteristic charts of an optical filter having a long-period grating with a grating length of 40 mm and a grating period of 401.5 $\mu$m.

As shown in FIG. 1, when observed in a wide wavelength range, the optical filter has a plurality of loss peak wavelengths. For example, the transmittance of core mode light becomes about −3.4 dB, −2.0 dB, and −1.0 dB at its loss peak wavelengths of 1547.5 nm, 1420 nm, and 1360 nm, respectively. These wavelengths are those satisfying a phase matching condition between core mode and cladding mode.

On the other hand, as shown in FIG. 2, in a wavelength band of 1530 nm to 1565 nm near one loss peak wavelength of 1547.5 nm, there are wavelengths where the loss attains a maximum value, in addition to the loss peak wavelength. Namely, not only the loss of core mode light is maximized at a loss peak wavelength of 1547.5 nm (main peak), but also the loss is maximized at a wavelength of 1538 nm which is shorter than the loss peak wavelength, at a wavelength of 1557 nm which is longer than the loss peak wavelength, and the like (side peaks). When ripples are thus generated in the transmission characteristic of an optical filter, light components which should not have been attenuated would attenuate as well.

For example, T. Erdogan, J. Opt. Soc. Am. A/Vol. 14, No. 8, pp. 1760–1773 (1997) and Japanese Patent Application Laid-Open No. 9- 236720 disclose techniques for restraining ripples such as those mentioned above from occurring. However, the optical filter disclosed in the former literature is unclear in terms of a specific restraining method, and each of the optical filters disclosed in these literatures has a transmission characteristic asymmetrical with respect to the loss peak wavelength.

In order to overcome the above-mentioned problems, it is an object of the present invention to provide an optical filter in which a long-period grating formed in an optical waveguide attenuates core mode light having a predetermined wavelength by causing it to couple with cladding mode light, the optical filter having a symmetrical transmission characteristic with respect to the loss peak wavelength and suppressing the loss caused by ripples; and a method of making the same.

The optical fiber according to the present invention comprises an optical waveguide, such as an optical fiber or the like, including a core region having a predetermined refractive index and a cladding region, provided at an outer periphery of the core region, having a lower refractive index than the core region; and a long-period grating provided in at least the core region of the optical waveguide.

In particular, a filter area provided with the long-period grating is an area where change of the refractive index of the core region periodically occurs along an advancing direction of signal light. The periodical change of the refractive index along the advancing direction of the signal light can be defined by a refractive index modulation function. In the refractive index modulation function, the interval between individual points exhibiting an average refractive index in the filter area is constant along the advancing direction of the signal light, whereas, in the refractive index modulation function, values (indicating refractive index in the filter area) of maximum points and values (indicating refractive index in the filter area) of minimum points vary along the advancing direction of the signal light. Also, this refractive index modulation function has such a form that a first function, which passes through the maximum points of the refractive index modulation function, and a second function, which passes through the minimum points of the refractive index modulation function, project opposite each other with respect to an axis indicating the average refractive index of the filter area.

Here, as explicitly indicated in U.S. Pat. No. 5,703,978 as well, the above-mentioned long-period grating is a grating which induces coupling (mode coupling) between core mode light and cladding mode light which propagate through an optical waveguide such as optical fiber, and is clearly distinguishable from a short-period grating which reflects a light component having a predetermined wavelength. Also, for yielding a strong power conversion from the core mode light to the cladding mode light, the grating period (pitch) in the long-period grating is set such that the optical path difference between the core mode light and the cladding mode light becomes $2\pi$. Thus, since the long-period grating acts to couple the core mode light to the cladding mode light, the core mode light attenuates over a narrow band centered at a predetermined wavelength (hereinafter referred to as loss peak wavelength).

The optical filter according to the present invention may comprise, at a predetermined position in the core region, a plurality of long-period gratings having periods of refractive index change, i.e., grating periods, different from each other with the same loss peak wavelength.

As a result of the configuration mentioned above, the optical filter according to the present invention makes it possible, in awavelength band containing only one loss peak wavelength which satisfies a phase matching condition between the core mode light propagating through the core region and the cladding mode light propagating through the cladding region provided at the outer periphery of the core region, to suppress ripples (side peaks) of loss in the wavelength range to 0.2 dB or less. Thus, since the optical filter according to the present invention can suppress the maximum value of loss of unnecessary ripples to 0.2 dB or less, the wavelength dependence of signal light intensity is expected to improve, for example, in an optical communication system employing this optical filter together with an optical amplifier. Namely, equalization characteristics indicating deviations among light intensities at respective wavelengths would be improved.

In order to make an optical filter having a structure such as that mentioned above, the method of making an optical filter in accordance with the present invention comprises the following specific steps.

First, in the method of making an optical filter according to the present invention, an optical waveguide, through which signal light propagates, having a core region with a predetermined refractive index doped with an impurity such as germanium oxide and a cladding region having a lower refractive index than the core region is prepared. Examples of this optical waveguide include an optical fiber and the like.

A grating forming area (which is also referred to as filter area) of thus prepared optical waveguide is successively subjected to first and second exposure steps so as to be irradiated with their predetermined wavelengths of light. For example, in the case where the core region is doped with germanium oxide, a refractive index change is induced in the core region upon irradiation with ultraviolet light.

In the first exposure step, the grating forming area is irradiated with first light having a predetermined wavelength, which is light for changing the refractive index of the core region and is intensity-modulated along an advancing direction of the signal light (aligning with the longitudinal direction of the optical waveguide). Here, the first exposure step is an exposure step for inducing a refractive index change in the grating forming area. In the first exposure step, the amount of irradiation of the first light in the grating forming area changes along the advancing direction of the signal light.

The second exposure step is carried out subsequent to the first exposure step. In the second exposure step, the grating forming area is irradiated with second light having a predetermined wavelength, which is light for changing the refractive index of the core region. Here, the second light and the first light may have the same wavelength. The first exposure step alone cannot cause the interval between individual points exhibiting the average refractive index of the filter area to become constant along the advancing direction of the signal light, in the above-mentioned refractive index modulation function. Therefore, the second exposure step is employed as an exposure step for causing the individual points to have a constant interval therebetween along the advancing direction of the signal light. Here, the amount of irradiation of second light in the grating forming area varies over the whole grating forming area.

For example, in the first exposure step, the inside of the grating forming area is irradiated with the first light while a local area where the first light reaches is relatively moved along the advancing direction of the signal light. Here, the moving speed of the local area is adjusted such that the amount of irradiation of first light in the grating forming area is maximized at a part excluding both ends of the grating forming area. As a consequence, the amplitude of refractive index near the center in the grating forming area is maximized. In the second exposure step, on the other hand, the inside of the grating forming area is irradiated with the second light while a local area where the second light reaches is relatively moved along the advancing direction of the signal light. Here, the moving speed of the local area is adjusted such that the amount of irradiation of second light in the grating forming area is maximized at each of parts including both ends of the grating forming area. As a result, the refractive index change near both ends in the grating forming area becomes greater than that near the center thereof. Here, the first and second exposure steps may also be carried out by means of first and second filters whose respective transmittances vary along the advancing direction of the signal light.

Also, when the light irradiation amount at each part of the grating forming area is changed between the first and second exposure steps as mentioned above, a refractive index modulation function defining the refractive index change in the resulting filter area attains such a form that a first function, which passes through maximum points of the refractive index modulation function and a second function, which passes through minimum points of the refractive index modulation function, project opposite each other with respect to an axis indicating the average refractive index of the filter area.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3A is a view showing the schematic configuration of a first embodiment of the optical filter according to the present invention, whereas

FIG. 9A is a view showing the schematic configuration of a second embodiment of the optical filter according to the present invention, whereas

DESCRIPTION OF THE PREFERRED EMBODIMENTS

In the following, embodiments of the optical filter according to the present invention will be explained with reference to FIGS. 3A to 12B. In the explanation of the drawings, parts identical to each other will be referred to with numerals or letters identical to each other, without repeating their overlapping descriptions.

First Embodiment

Figure 3A:
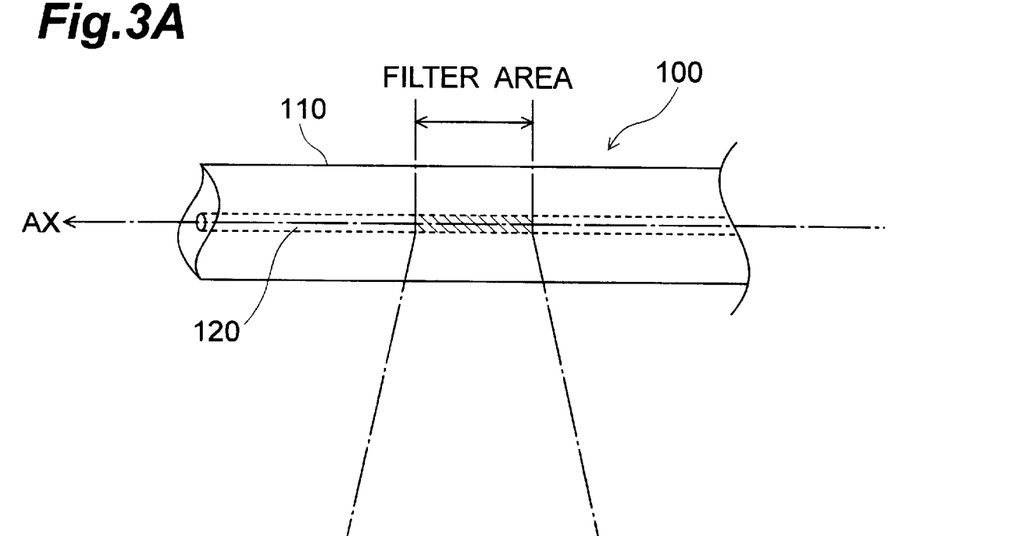
Figure 3B:
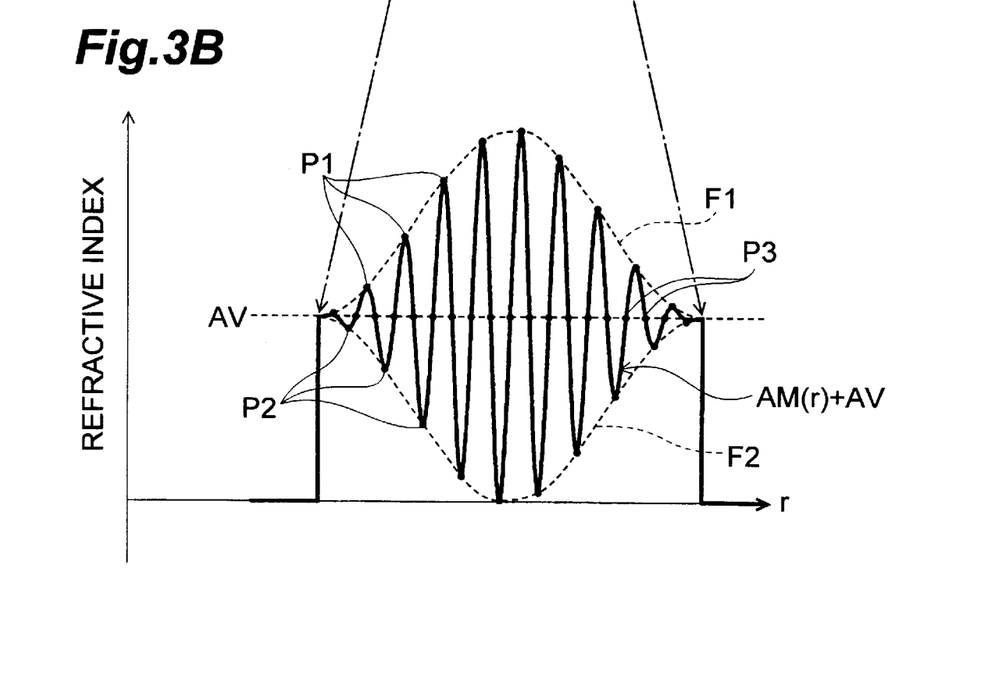
FIG. 3B is a chart (corresponding to a refractive index modulation function) showing the refractive index, along the/optical axis (advancing direction of signal light), of the filter area provided with a long-period grating in FIG. 3A.

To begin with, a first embodiment of the optical filter according to the present invention will be explained. FIG. 3A is a view showing the schematic configuration of the optical filter in accordance with the first embodiment, whereas FIG. 3B is a chart showing the change in refractive index in its filter area, i.e., the refractive index change along the longitudinal direction of a long-period grating in the optical filter. As shown in FIG. 3A, an optical fiber 100, which is an optical waveguide, comprises a core region 110 having a predetermined refractive index, and a cladding region 120 provided on the outer periphery of the core region 110. The core region 110 contains germanium oxide. In the optical filter according to this embodiment, the long-period grating formed in the filter area of the optical fiber 100 couples a core mode of a light component having a predetermined wavelength to a cladding mode thereof, thereby attenuating this light component. Also, as shown in FIG. 3B, the amplitude center of the refractive index change is constant along the optical axis of the optical fiber 100, in the filter area formed with the long-period grating. In the filter area, the amplitude of refractive index change varies along the optical axis.

Namely, letting the average refractive index in the filter area be AV, the amplitude of refractive index can be given as a function AM(r) of the distance r along the optical axis. Consequently, a refractive index modulation function defining the refractive index change in the filter area is given by AM(r)+AV.

As shown in FIG. 3B, the first embodiment is characterized in that the interval between the individual points P3 exhibiting the average refractive index AV is constant along the optical axis of the optical fiber 100. Also, in the refractive index modulation function of FIG. 3B, values of maximum points P1 and values of minimum points P2 change along the optical axis. Specifically, in the filter area, the refractive index modulation function has such a form that a first function F1, which passes through the maximum points P1 of the refractive index modulation function, and a second function F2, which passes through the minimum points P2 of the refractive index modulation function, project opposite each other with respect to the axis indicating the average refractive index AV. In this embodiment, the absolute value of the refractive index change amplitude AM(r) becomes greater as the center of the filter area is nearer. In the optical filter according to this embodiment, the maximum value of loss (maximum value of ripple loss) in wavelengths other than the loss peak wavelength is 0.2 dB or less.

FIGS. 4A to 5C are views for explaining an example of the method of making an optical filter according to the first embodiment. The prepared optical fiber 100 comprises the core 110 and the cladding 120, whereas the core 110 is doped with germanium oxide. In response to the ultraviolet light irradiation amount, germanium oxide causes the refractive index of the core 100 to increase.

Figure 4A:
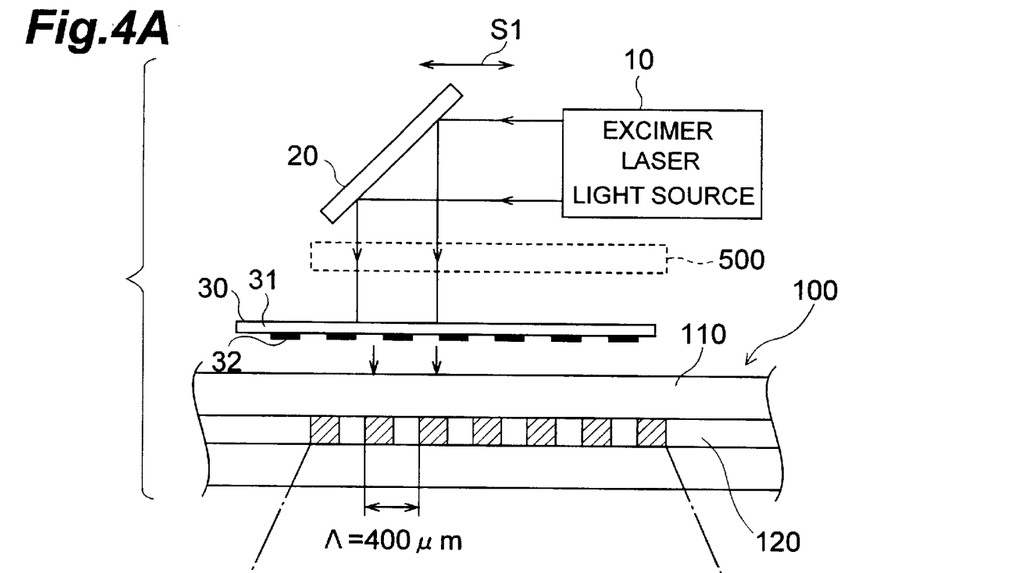
FIG. 4 is a view for explaining the first-half step (first exposure step) in the method of making an optical filter according to the present invention.
Figure 4B:
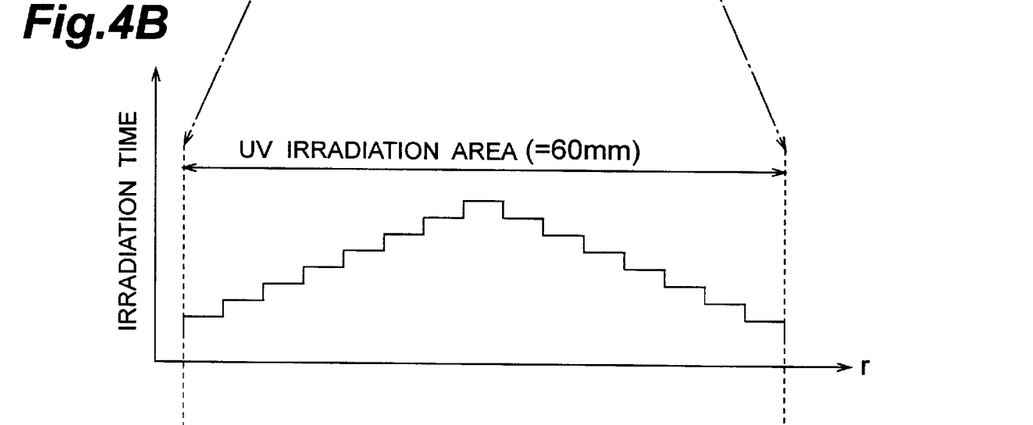
FIG. 4B is a graph showing the ultraviolet light irradiation time in an ultraviolet light irradiation area (grating forming area) of a prepared optical fiber in the exposure step shown in FIG. 4A along the optical axis.
Figure 4C:
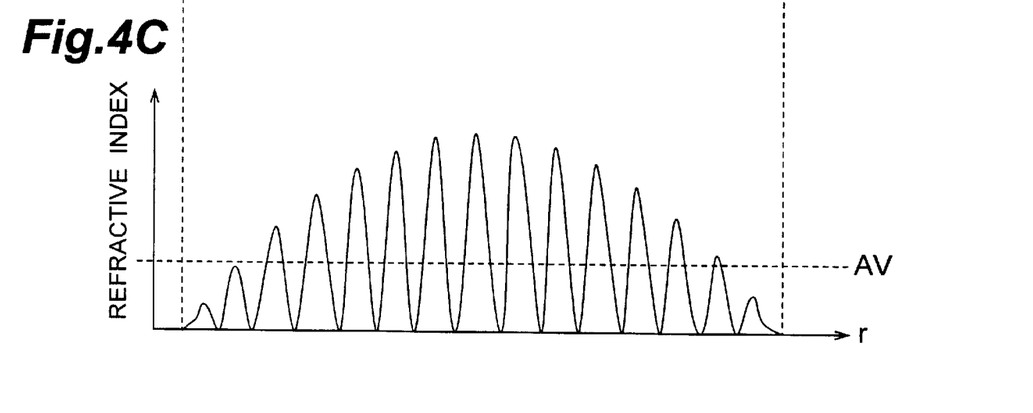
FIG. 4C is a chart showing the refractive index change, along the optical axis, formed as a result of the exposure step shown in FIGS. 4A and 4B.

Initially, in the first exposure step for inducing a refractive index change within the core 110, ultraviolet light is emitted from an excimer laser light source 10 as shown in FIG. 4A. Thus emitted ultraviolet light is reflected by a total reflection mirror 20 and, after passing through an intensity-modulating mask 30, irradiates the grating forming area of the optical fiber 100. Here, the ultraviolet light transmitted through the intensity-modulating mask 30 has been intensity-modulated along the optical axis of the optical fiber 100. At this time, as the total reflection mirror 20 is scanned along the optical axis of the optical fiber 100 (i.e., in arrowed directions S1 in FIG. 4A), the ultraviolet light emitted from the excimer laser light source 10 irradiates the whole area to be formed with the long-period grating in the optical fiber 100. Also, the scanning speed of the total reflection mirror 20 is set appropriately such that, as shown in FIG. 4B, the irradiation amount of ultraviolet light, being proportional to irradiation time, becomes greater as the center of the grating forming area in the optical fiber 100 is nearer. The intensity-modulating mask 30 is formed, for example, by a flat glass sheet 31, transparent to the ultraviolet light emitted from the excimer laser light source 10; and metal films 32, formed thereon with a predetermined width and a predetermined period, for blocking the ultraviolet light. Consequently, as shown in FIG. 4C, the amount of change in refractive index of the core 110 in the optical fiber 100 becomes greater as the center of the grating forming area is nearer. In the first exposure step, a first filter 500 in which the transmittance of ultraviolet light (yielding the maximum transmittance near the center of the grating forming area) changes along the optical axis of the optical fiber 100 may be arranged in the optical path of the ultraviolet light. In this case, the scanning speed of the total reflection mirror 20 may be kept constant. Also, it becomes possible for the grating forming area as a whole to be collectively exposed to the ultraviolet light.

Figure 5A:
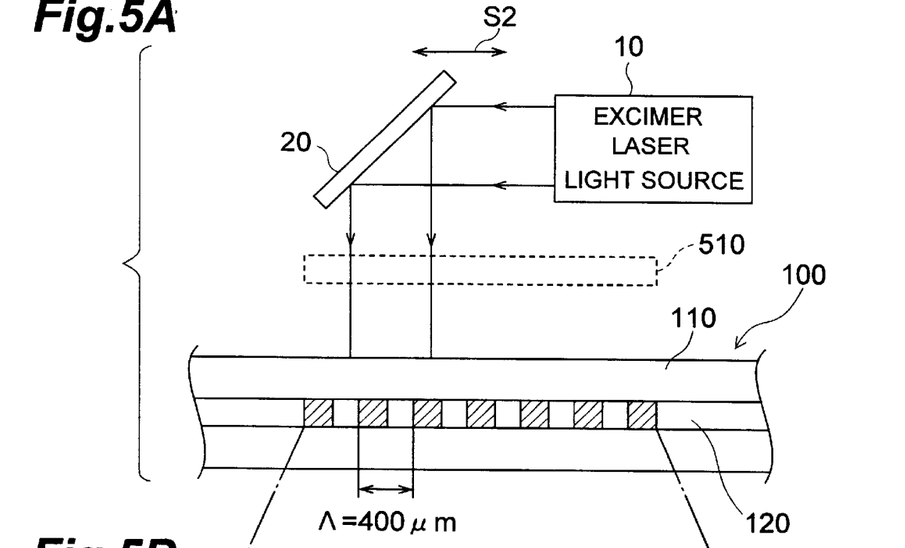
FIG. 5A is a view for explaining the second-half step (second exposure step) in the method of making an optical filter according to the present invention.
Figure 5B:
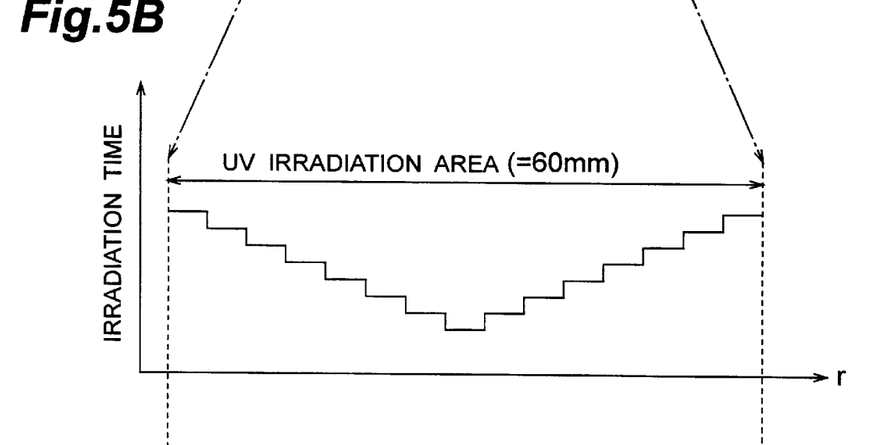
FIG. 5B is a graph showing the ultraviolet light irradiation time in an ultraviolet light irradiation area (grating forming area) of the prepared optical fiber in the exposure step shown in FIG. 5A along the optical axis.
Figure 5C:
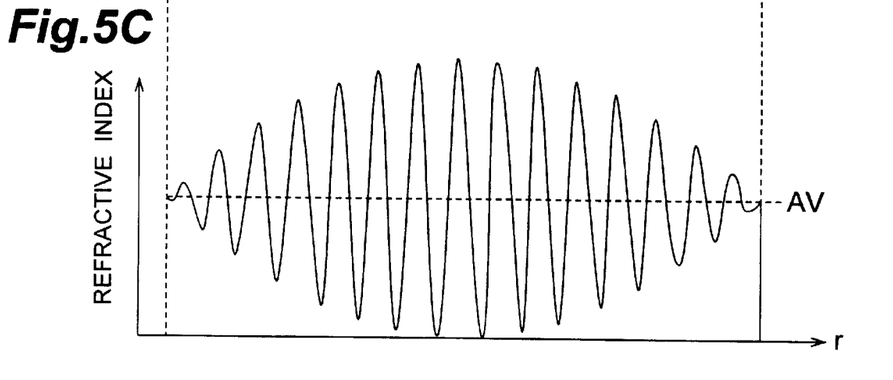
FIG. 5C is a chart showing the refractive index change, along the optical axis, formed as a result of the exposure step shown in FIGS. 5A and 5B.

In the long-period grating obtained by the first exposure step, as shown in FIG. 4C, the interval between individual parts exhibiting the average refractive index is not constant. Therefore, in the second exposure step, the ultraviolet light is emitted from the excimer laser light source 10 in the state where the intensity-modulating mask 30 is removed therefrom as shown in FIG. 5A. The emitted ultraviolet light is reflected by the total reflection mirror 20 and then reaches the grating forming area of the optical fiber 100. At this time, with the scanning speed of the total reflection mirror 20 being set appropriately, the total reflection mirror 20 is scanned in arrowed directions S2 in FIG. 5A, such that the irradiation amount of ultraviolet light becomes greater as the peripheries of the grating forming area are nearer (see FIG. 5B). Also, the ultraviolet light irradiation time is adjusted over the whole grating forming area. In thus obtained long-period grating (refractive index change of the filter area), the interval between the individual parts yielding the average refractive index AV in the filter area becomes constant as shown in FIG. 5C. In the second exposure step, a second filter 510 in which the transmittance of ultraviolet light (yielding the maximum transmittance near both ends of the grating forming area) changes along the optical axis of the optical fiber 100 may be disposed in the optical path of the ultraviolet light. In this case, the scanning speed of the total reflection mirror 20 may be kept constant. Also, it becomes possible for the grating forming area as a whole to be collectively exposed to the ultraviolet light. The grating period is defined on the axis indicating the average refractive index AV.

Figures 6A, 6B:
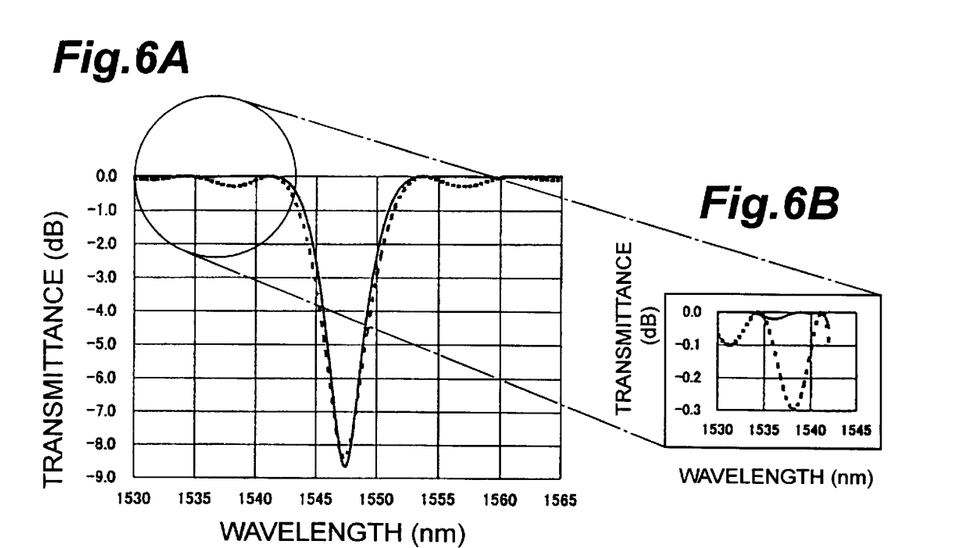
FIGS. 6A and 6B are graphs showing the transmission characteristic of a sample, which belongs to the first embodiment of the optical filter according to the present invention, having a grating pitch of 400 μm, a grating length of 60 mm, and 15 stages of ultraviolet irradiation amount, wherein FIG. 6B, in particular, is a graph showing how the transmission characteristic improves in a local wavelength band where ripples (side peaks) occur.
Figures 7A, 7B:
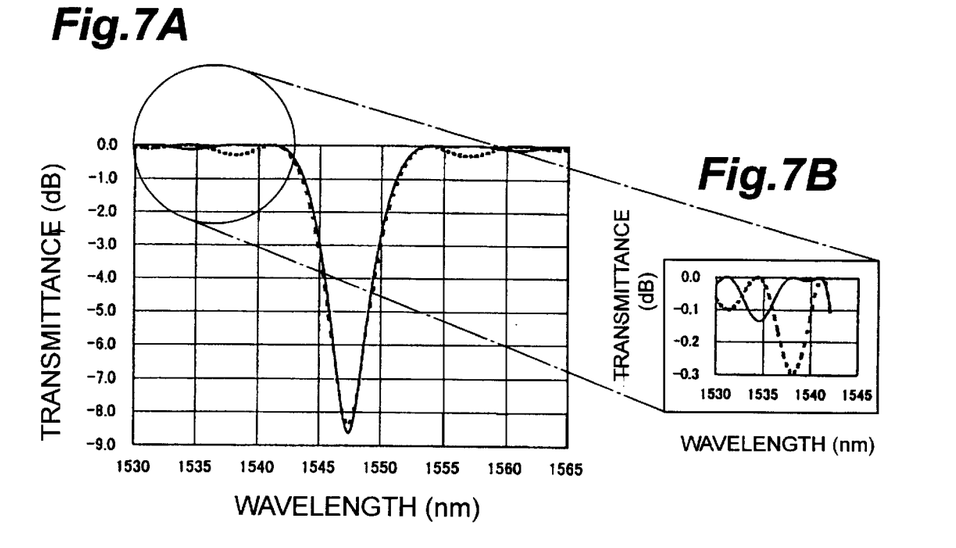
FIGS. 7A and 7B are graphs showing the transmission characteristic of a sample, which belongs to the first embodiment of the optical filter according to the present invention, having a grating pitch of 400 μm, a grating length of 48 mm, and 3 stages of ultraviolet irradiation amount, wherein FIG. 7B, in particular, is a graph showing how the transmission characteristic improves in a local wavelength band where ripples (side peaks) occur.
Figure 8A:
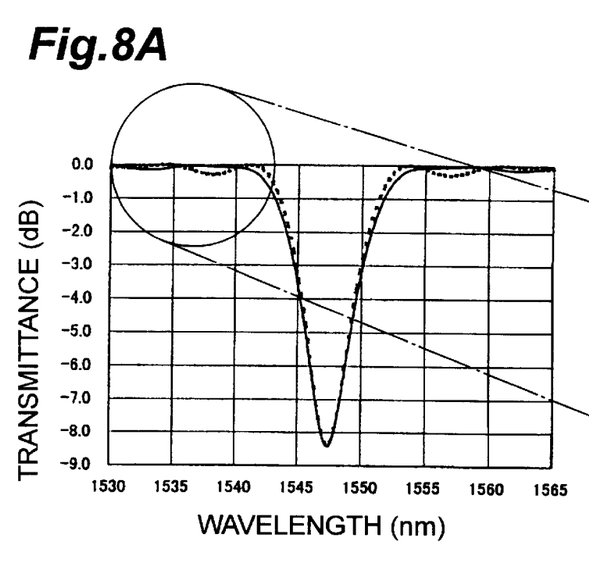
FIGS. 8A and 8B are graphs showing the transmission characteristic of a sample, which belongs to the first embodiment of the optical filter according to the present invention, having a grating pitch of 400 μm, a grating length of 43 mm, and 2 stages of ultraviolet irradiation amount, wherein FIG. 8B, in particular, is a graph showing how the transmission characteristic improves in a local wavelength band where ripples (side peaks) occur.
Figure 8B:
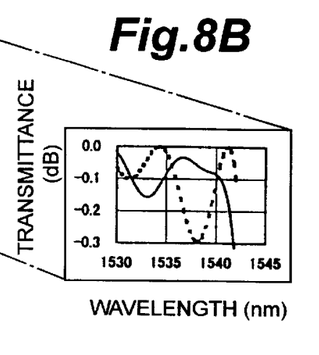

FIGS. 6A to 8B are charts showing the transmission characteristics of thus manufactured optical filters according to the first embodiment. FIGS. 6A, 7A, and 8A show the transmission characteristics of the optical filters in the wavelength band of 1530 nm to 1560 nm. Also, FIGS. 6B, 7B, and 8B show enlarged charts of the transmission characteristics of the optical filters in the wavelength band of 1530 nm to 1542 nm. These charts not only indicate the transmission characteristics of the optical filters according to the first embodiment by solid lines, but also indicate the transmission characteristics of a conventional optical filter by broken lines. In the conventional optical filter, the period of refractive index change (grating period) is 401.5 $\mu$m, the grating length is 40 mm, and the amplitude of refractive index change is constant.

In the first sample having the transmission characteristic shown in FIGS. 6A and 6B, the grating period is 400 $\mu$m, the grating length is 60 mm, and the scanning speed of the total reflection mirror 20, i.e., the ultraviolet light irradiation amount in the grating forming area, is changed by 15 stages with identical intervals. As can be seen from these charts, while the loss caused by ripples in the conventional optical filter is 0.3 dB, the loss caused by ripples is reduced to 0.02 dB in the first sample.

In the second sample having the transmission characteristic shown in FIGS. 7A and 7B, the grating period is 400 $\mu$m, the grating length is 48 mm, and the scanning speed of the total reflection mirror 20, i.e., the ultraviolet light irradiation amount in the grating forming area, is changed by 3 stages with identical intervals. As can be seen from these charts, while the loss caused by ripples in the conventional optical filter is 0.3 dB, the loss caused by ripples is reduced to 0.13 dB in the second sample.

In the third sample having the transmission characteristic shown in FIGS. 8A and 8B, the grating period is 400 $\mu$m, the grating length is 43 mm, and the scanning speed of the total reflection mirror 20, i.e., the ultraviolet light irradiation amount in the grating forming area, is changed by 2 stages, i.e., 15 mm and 28 mm. As can be seen from these charts, while the loss caused by ripples in the conventional optical filter is 0.3 dB, the loss caused by ripples is reduced to 0.15 dB in the third sample.

As can be seen from the transmission characteristics of the optical filters (first to third samples) according to the first embodiment shown in FIGS. 6A to 8B, when the optical filter is configured such that a plurality of long-period gratings having the same average refractive index AV with amplitudes of refractive index change different from each other are cascaded to each other, the loss caused by ripples can be suppressed. Also, when the long-period grating is formed such that the amplitude of refractive index change is symmetrical with respect to the optical axis of the optical fiber, the loss caused by ripples can further be suppressed. Further, the greater is the number of stages of change in ultraviolet light irradiation amount in the grating forming area, the more the loss caused by ripples (occurrence of side peaks) can be suppressed.

Second Embodiment

A second embodiment of the optical filter according to the present invention will now be explained. The optical filter according to the second embodiment is characterized in that a plurality of long-period gratings having grating periods different from each other with the same loss peak wavelength are cascaded to each other. Also, in the optical filter according to the second embodiment, the maximum value of loss at wavelengths other than the loss peak wavelength is 0.2 dB or less.

Figure 9A:
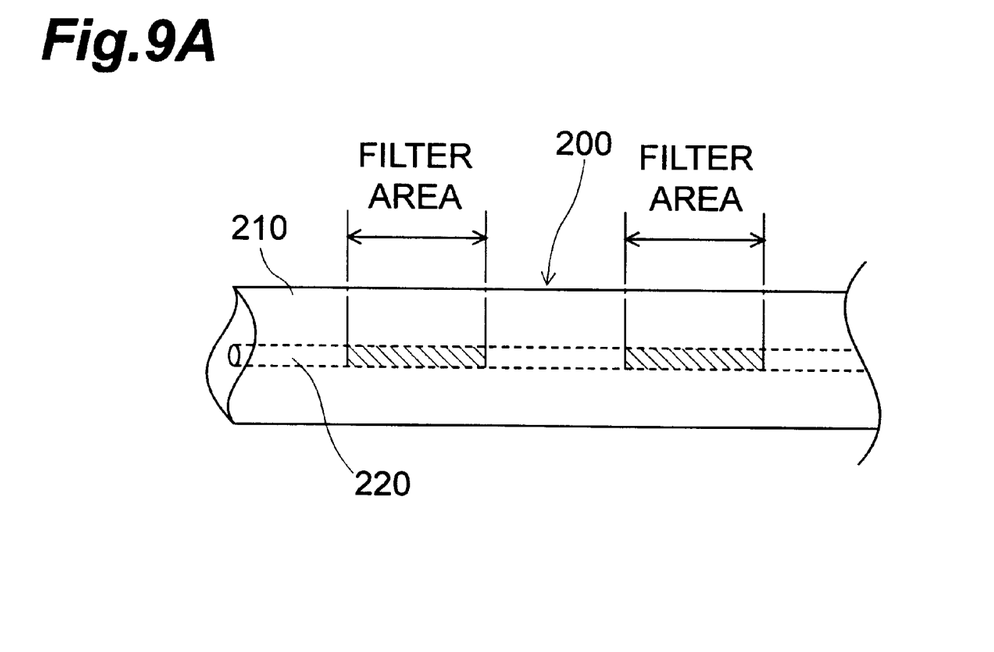
Figure 9B:
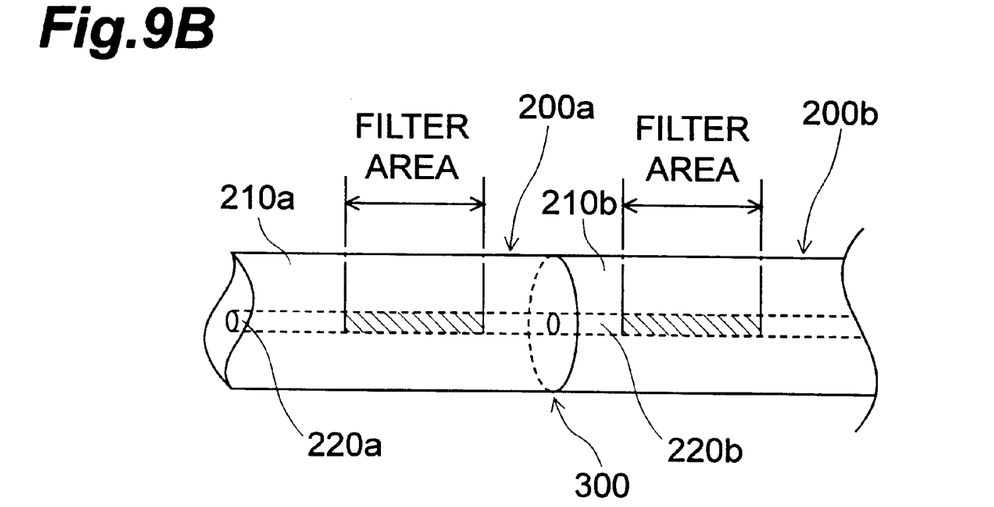
FIG. 9B is a view showing another configuration for realizing the second embodiment.

Specifically, as shown in FIG. 9A, an optical fiber 200 having a core 210 and a cladding 220 is prepared, and a long-period grating is formed at each of a plurality of areas within the core 210. Alternatively, as shown in FIG. 9B, a first optical fiber 200a having a core 210a formed with a long-period grating and a cladding 220a, and a second optical fiber 200b having a core 210b formed with a long-period grating and a cladding 220b may be connected to each other by fusion. In FIG. 9B, 300 refers to the fused portion between the first and second optical fibers 200a, 200b.

Figures 10A, 10B:
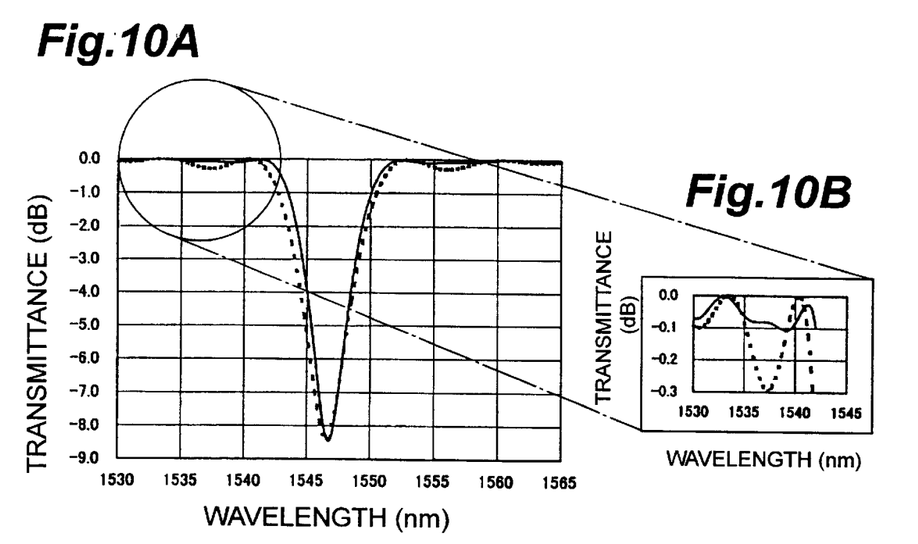
FIGS. 10A and 10B are graphs showing the transmission characteristic of a sample, high belongs to the second embodiment of the optical filter according to the present invention, provided with a first long-period grating having a grating pitch of 402.1 μm, a grating length of 40 mm, and a loss peak wavelength of 1546.5 nm and a second long-period grating having a grating pitch of 406.3 μm, a grating length of 15 mm, and a loss peak wavelength of 1546.5 nm, wherein FIG. 10B, in particular, is a graph showing how the transmission characteristic improves in a local wavelength band where ripples (side peaks) occur.
Figures 11A, 11B:
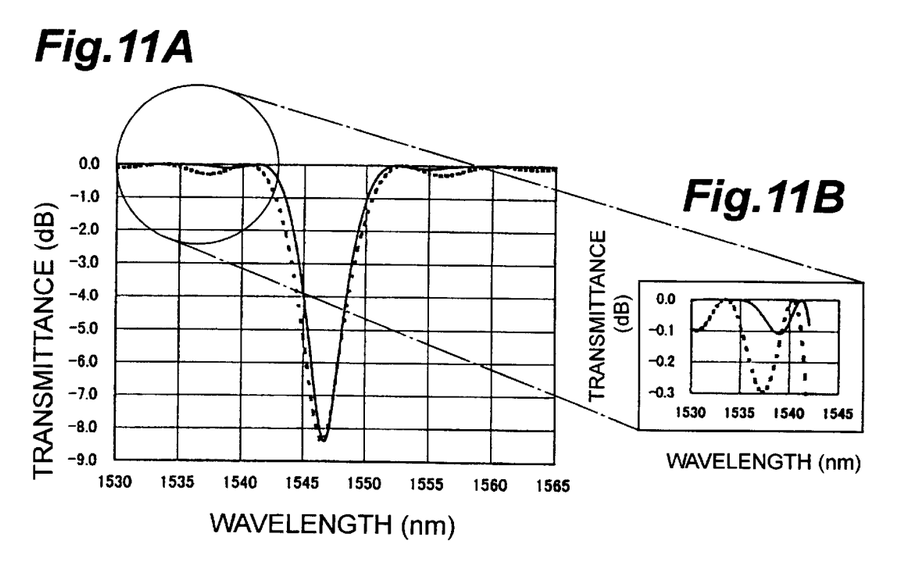
FIGS. 11A and 11B are graphs showing the transmission characteristic of a sample, which belongs to the second embodiment of the optical filter according to the present invention, provided with a first long-period grating having a grating pitch of 406.3 μm, a grating length of 10 mm, and a loss peak wavelength of 1546.5 nm and a second long-period grating having a grating pitch of 402.1 μm, a grating length of 38 mm, and a loss peak wavelength of 1546.5 nm, wherein FIG. 11B, in particular, is a graph showing how the transmission characteristic improves in a local wavelength band where ripples (side peaks) occur.
Figure 12A:
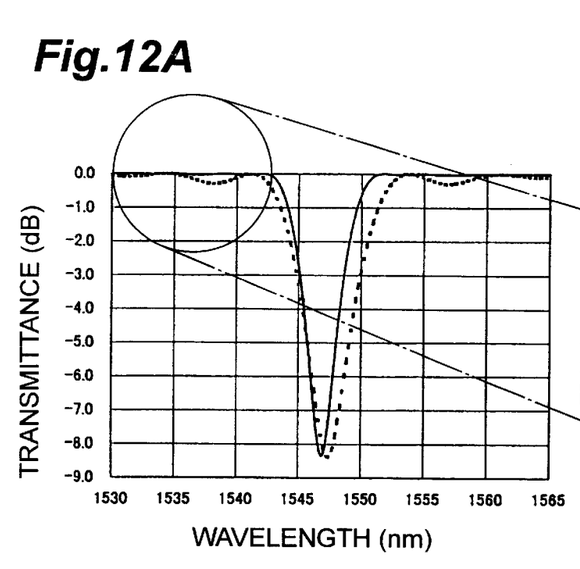
FIGS. 12A and 12B are graphs showing the transmission characteristic of a sample, which belongs to the second embodiment of the optical filter according to the present invention, provided with 11 long-period gratings, each having a grating length of 6.2 mm and a loss peak wavelength of 1546.9 nm, whose grating pitches differ from each other, wherein FIG. 12B, in particular, is a graph showing how the transmission characteristic improves in a local wavelength band where ripples (side peaks) occur.
Figure 12B:
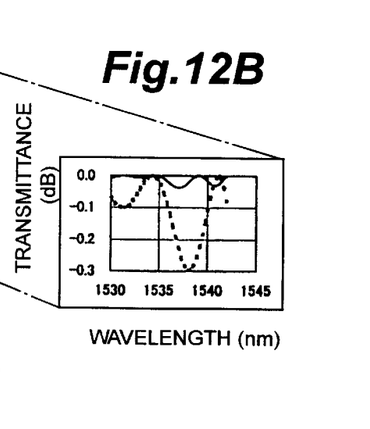

FIGS. 10A to 12B are charts showing the transmission characteristics of optical filters according to the second embodiment. FIGS. 10A, 11A, and 12A show the transmission characteristics of the optical filters in the wavelength band of 1530 nm to 1560 nm. Also, FIGS. 10B, 11B, and 12B show enlarged charts of the transmission characteristics of the optical filters in the wavelength band of 1530 nm to 1542 nm. These charts not only indicate the transmission characteristics of the optical filters according to the second embodiment by solid lines, but also indicate the transmission characteristics of a conventional optical filter by broken lines. In the conventional optical filter, the period of refractive index change (grating period) is 401.5 $\mu$m, the grating length is 40 mm, and the amplitude of refractive index change is constant.

In the fourth sample having the transmission characteristic shown in FIGS. 10A and 10B, a first long-period grating having a grating length of 40 mm, a grating period of 402.1 $\mu$m, and a loss peak wavelength of 1546.5 nm; and a second long-period grating having a grating length of 15 mm, a grating period of 406.3 $\mu$m, and a loss peak wavelength of 1546.5 nm are cascaded to each other. As can be seen from these charts, while the loss caused by ripples in the conventional optical filter is 0.3 dB, the loss caused by ripples is reduced to 0.1 dB in the fourth sample.

In the fifth sample having the transmission characteristic shown in FIGS. 11A and 11B, a first long-period grating having a grating length of 10 mm, a grating period of 406.3 $\mu$m, and a loss peak wavelength of 1546.5 nm; a second long-period grating having a grating length of 38 mm, a grating period of 402.1 $\mu$m, and a loss peak wavelength of 1546.5 nm; and a third long-period grating having the same configuration as that of the first long-period grating are cascaded to each other. As can be seen from these charts, while the loss caused by ripples in the conventional optical filter is 0.3 dB, the loss caused by ripples is reduced to 0.1 dB in the fifth sample.

In the sixth sample having the transmission characteristic shown in FIGS. 12A and 12B, first to eleventh long-period gratings each having a grating length of 6.2 mm and a loss peak wavelength of 1546.9 nm are successively cascaded to each other. The first to eleventh long-period gratings have grating periods of 406.44 $\mu$m, 405.56 $\mu$m, 404.68 $\mu$m, 403.80 $\mu$m, 402.93 $\mu$m, 402.07 $\mu$m, 402.93 $\mu$m, 403.80 $\mu$m, 404.68 $\mu$m, 405.56 $\mu$m, and 406.44 $\mu$m, respectively. As can be seen from these charts, while the loss caused by ripples in the conventional optical filter is 0.3 dB, the loss caused by ripples is reduced to 0.04 dB in the sixth sample.

As can be seen from the transmission characteristics of the optical filters according to the second embodiment shown in FIGS. 10A to 12B, when a plurality of long-period gratings having grating periods different from each other with the same loss peak wavelength are formed so as to be cascaded to each other, the loss caused by ripples (occurrence of side peaks) can be suppressed. Also, when the long-period grating is formed such that the amplitude of refractive index change is symmetrical with respect to the optical axis of the optical fiber, the loss caused by ripples can further be suppressed. Further, the greater is the number of stages of change in ultraviolet light irradiation amount in the grating forming area, the more the loss caused by ripples (occurrence of side peaks) can be suppressed.

In accordance with the present invention, as explained in the foregoing, in a refractive index modulation function for defining the refractive index change in the filter area, the interval of individual points exhibiting the average refractive index is constant along the advancing direction of signal light, whereas the maximum values and minimum values in the refractive index modulation function vary along the advancing direction of signal light. As a consequence, in a wavelength band including only one loss peak wavelength that satisfies a phase matching condition between core mode light and cladding mode light, the maximum value of loss in wavelengths other than the loss peak wavelength is 0.2 dB or less. Hence, the loss caused by ripples, i.e., the occurrence of side peaks, can be suppressed. Therefore, in the case where this optical filter is employed in an optical transmission system having an optical amplifier, for example, the equalization characteristic of the wavelength dependence of light intensity in the optical transmission system can be improved.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical filter comprising:

a core region through which signal light propagates; and a long-period grating provided, at least, in a filter area of said core region, along an advancing direction of said signal light, for attenuating a wavelength component included in said signal light within a predetermined range including a loss peak wavelength, said filter area being an area where change of the refractive index of said core region periodically occurs along the advancing direction of said signal light;

wherein, in a refractive index modulation function defining change of said refractive index in said filter area along the advancing direction of said signal light, intervals between points exhibiting an average refractive index in said filter area are constant along the advancing direction of said signal light, and wherein, in said filter region, refractive indices corresponding to maximum points of said refractive index modulation function vary along the advancing direction of said signal light, and also refractive indices corresponding to minimum points of said refractive index modulation function vary along the advancing direction of said signal light.

2. An optical filter according to claim 1, wherein said refractive index modulation function has such a form that a first function and a second function project opposite each other with respect to an axis indicating the average refractive index of said filter area, said first function passing through said maximum points of said refractive index modulation function, said second function passing through said minimum points of said refractive index modulation function.

3. An optical filter according to claim 1, further comprising one or more long-period gratings having different periods of refractive index change from said long-period grating and having the same loss peak wavelength as said long-period grating, said one or more long-period gratings being respectively provided at predetermined positions within said core region.

4. An optical filter according to claim 1, wherein, in a wavelength band containing only one loss peak wavelength which satisfies a phase matching condition of core mode light propagating through said core region and cladding mode light propagating through said cladding region, a ripple of loss in said wavelength range is 0.2 dB or less.

5. A method of making the optical filter of claim 1, said method comprising:

a first step of preparing an optical waveguide through which signal light propagates, said optical waveguide having a core region of a predetermined refractive index doped with an impurity for changing a refractive index, and a cladding region having a lower refractive index than said core region;

a second step of irradiating a grating forming area of said optical waveguide with first light having a predetermined wavelength, said first light being light for changing the refractive index of said core region and being intensity-modulated along an advancing direction of said signal light, wherein the amount of irradiation of said first light varies along the advancing direction of said signal light; and a third step, carried out subsequent to said second step, of irradiating the grating forming area of said optical waveguide with second light having a predetermined wavelength, said second light being light for changing the refractive index of said core region, wherein the amount of irradiation of said second light in said grating forming area is adjusted such that, in a refractive index modulation function defining change of said refractive index in said grating forming area along the advancing direction of said signal light, intervals between points exhibiting an average refractive index in said grating forming area are constant along the advancing direction of said signal light.

6. A method according to claim 5, wherein, in said second step, the inside of said grating forming area is irradiated with said first light while a local area where said first light reaches is relatively moved along the advancing direction of said signal light, the moving speed of said local area being adjusted such that the amount of irradiation of said first light in said grating forming area is maximized at a part excluding both ends of said grating forming area.

7. A method according to claim 6, wherein, in said second step, the inside of said grating forming area is irradiated with said second light while a local area where said second light reaches is relatively moved along the advancing direction of said signal light, the moving speed of said local area being adjusted such that the amount of irradiation of said second light in said grating forming area is maximized at each of parts including both ends of said grating forming area.

8. A method according to claim 5, wherein, in said second step, said optical waveguide is irradiated with said first light passing through a first filter, said first filter having a transmittance changing so as to maximize the amount of transmission of said first light at a part excluding both ends of said grating forming area.

9. A method according to claim 8, wherein, in said third step, said optical waveguide is irradiated with said second light passing through a second filter, said second filter having a transmittance changing so as to maximize the amount of transmission of said second light at each of parts including both ends of said grating forming area.

* * * * *

UNITED STATES PATENT AND TRADEMARK OFFICE
CERTIFICATE OF CORRECTION

PATENT NO. : 6,253,008 B1
DATED : June 26, 2001
INVENTOR(S) : Michiko Takushima et al.

It is certified that error appears in the above-identified patent and that said Letters Patent is hereby corrected as shown below:

<u>Title page,</u>
Item [75], Inventors, change "Michiko Harumoto" to -- Michiko Takushima --

Signed and Sealed this

Fifteenth Day of January, 2002

*Attest:*

JAMES E. ROGAN
*Attesting Officer*        *Director of the United States Patent and Trademark Office*